March 6, 1928.
J. BILAN
1,661,281
ELECTRIC RADIATOR
Filed June 13, 1927
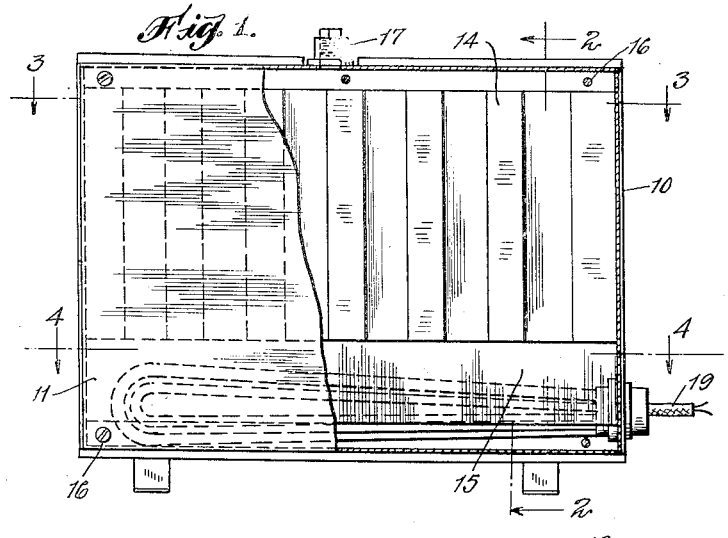
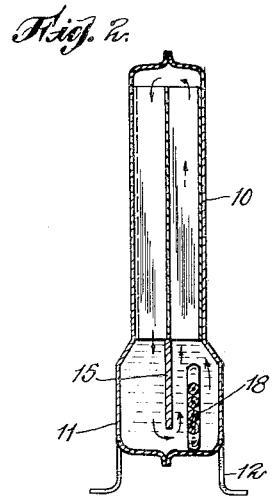
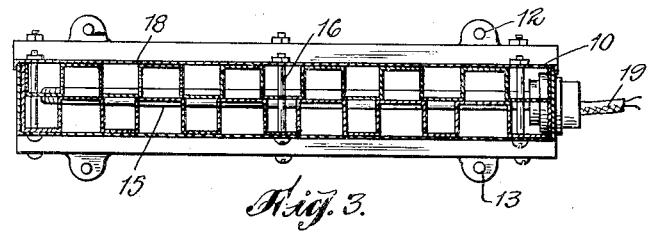
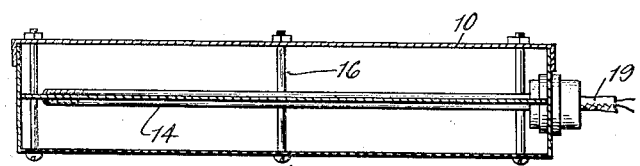
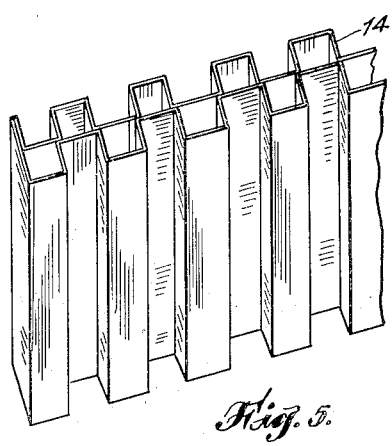
INVENTOR
John Bilan Patented Mar. 6, 1928.

1,661,281

UNITED STATES PATENT OFFICE.

JOHN BILAN, OF FLINT, MICHIGAN.

ELECTRIC RADIATOR.

Application filed June 13, 1927. Serial No. 198,447.

This invention relates to improvements in heating devices, particularly in devices such as radiators, and it is the principal object of my invention to provide a radiator in which water, alcohol or quicksilver may be employed as a heating medium, while the water is heated by means of an electric heating coil.

Another object of my invention is the provision of a radiator composed of a plurality of novel and improved radiating shells arranged in juxtaposition, and alternately projecting to one and the other side of the radiator.

A further object of the invention is the provision of an electrically heated radiator provided with means for ensuring a circulation of the heating medium such as water etc.

A still further object of my invention is the provision of a radiator of this type which is of simple and inexpensive construction, yet durable and efficient in its operation.

These and other objects and advantages of my invention will become more fully known as the description thereof proceeds, and will then be specifically defined in the appended claims.

In the accompanying drawing forming a material part of this disclosure:

Fig. 1 is a side elevation of a radiator constructed according to my invention, part of the outer wall being broken away to more clearly show the interior construction.

Fig. 2 is a section on line 2—2 of Figure 1.

Fig. 3 is a longitudinal section on line 3—3 of Figure 1.

Fig. 4 is a longitudinal section on line 4—4 of Figure 1.

Fig. 5 is a perspective fragmentary view of the radiator shells.

As illustrated, the radiator comprises a housing 10 having a lower enlarged part 11 supported by feet 12 adapted to be secured to the floor by means of suitable fastening means passing through the holes 13 therein. Within the upper part of the housing a plurality of shells 14 form a body as illustrated in Figure 5 composed of sheet metal or other suitable material preferably made of a single plate to form juxtaposed shells or cells alternately extending to both sides of a median line constituted by a vertically arranged baffle plate 15, and open at their upper as well as at their lower ends. The shells are held in position within the housing by suitable means such as for instance the cross-bolts 16. These bolts secure also the baffle plate in its position, and the ends of this baffle plate are spaced from the top as well as the bottom of the radiator, to allow a free circulation of the heating medium as indicated by the arrows in Figure 2. This heating medium, for instance water is filled into the radiator through the upper filler opening closed by a suitable plug 17 or the like and collects in the lower wider part 11 of the housing. In this part are arranged preferably to one side of the baffle plate as shown in Figure 2, a plurality of electric heating coils 18 adapted to be heated from any source of electricity with which the coils are connected through a cable 19 of any well known construction.

The operation of my device will be entirely clear from the above description when read on the drawings, and while I have shown and described as an example the preferred form of my device it will be clear that I may make such changes in the general arrangement thereof and in the construction of its minor details as come within the scope of the appended claims without departure from the spirit of the invention.

Having thus described my invention, what I claim as new, and desire to secure by Letters Patent is:

1. Electric radiator comprising a plurality of cells, a housing for said cells, a median baffle plate, said housing adapted to be supplied with a heating medium, and a means for electrically heating said medium to circulate the same through said cells around said baffle plate.

2. Electric radiator comprising a housing, a lower wider part formed with said housing, a plurality of heat radiating shells within said housing, a baffle plate, a plurality of electric heating coils in the wider part of the housing, connections between said coils and a source of electricity, a means for allowing the introduction of a heating medium into the radiator, and a means for supporting said radiator on a floor and allowing its securing thereto.

3. In an electric radiator of the class described, a plurality of radiator cells, each of substantially square cross-section, said cells made from a metal plate suitably bent to form said cells in juxtaposition and alternately extending to both sides of a median line, said radiator having an upper filler opening for the introduction of a heating medium, a plug for closing said opening, and a plurality of coils adapted to be heated from a source of electricity below said cells.

Signed at Flint, in the county of Genesee and State of Michigan, this 7th day of June, A. D. 1927.

JOHN BILAN.